స

2,920,073

11α-HYDROXY-16,17 OXIDO-PROGESTERONE AND ESTERS THEREOF

Herbert C. Murray, Hickory Corners, and Durey H. Peterson, Kalamazoo, Mich., assignors to The Upjohn Company, Kalamazoo, Mich., a corporation of Michigan No Drawing. Application May 14, 1953
Serial No. 355,152

6 Claims. (Cl. 260—239.55)

This invention relates to steroid compounds and is more particularly concerned with the novel 11α-hydroxy-16,17-oxidoprogesterone and esters thereof.

The novel compounds of the present invention may be represented by the following structural formula:

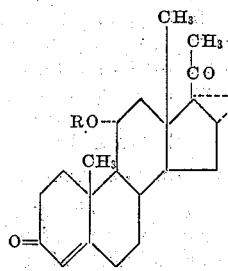

wherein R is selected from hydrogen and an acyl radical, especially an acyl radical of a hydrocarbon carboxylic acid, or of a toluene-sulfonic acid, and preferably containing up to eight carbon atoms, inclusive.

As described in the application of which this is a continuation-in-part, Serial Number 297,242, filed July 5, 1952, now Patent No. 2,735,800 issued February 21, 1956, which is a continuation-in-part of application Serial Number 272,944, filed February 23, 1952, now Patent No. 2,602,769, issued July 8, 1952, and application Serial Number 180,496, filed August 19, 1950, now abandoned, the novel 11α-hydroxy compounds of the present invention may be prepared from 16,17-oxidoprogesterone by the oxygenating action of a culture of fungus of the order Mucorales, whereafter the resulting oxygenated products may be esterified.

It is an object of this invention to provide the novel 11α-hydroxy-16,17-oxidoprogesterone and esters thereof. Other objects will be apparent to those skilled in the art to which this invention pertains.

The compounds of the present invention, 11α-hydroxy-16,17-oxidoprogesterone and esters thereof, are readily crystallizable solids which possess valuable pharmacological and physiological activity. They are also important intermediates in the production of 11-oxygenated adrenocortical hormones. For example, cortisone acetate is prepared by reducing 11α-hydroxy-16,17-oxidoprogesterone with lithium aluminum hydride to give 3β,11α,17α,20-tetrahydroxy-4-pregnene which by oxidation with chromic acid results in 17α-hydroxy-4-pregnene-3,11,20-trione. Treatment of this compound with lead tetraacetate is productive of 17α-hydroxy-21-acetoxy-4-pregnene-3,11,20-trione (cortisone acetate). Other ways of employing the compounds of the present invention in the preparation of valuable pharmacologically-active steroids such as cortisone or cortisone acetate will be apparent to one skilled in the art.

According to the method of the present invention, 16,17-oxidoprogesterone [Percy L. Julian et al., J. Am. Chem. Soc. 71, 756 (1949)] is oxidized by contacting it with a fungus of the family Mucoraceae, preferably of the genus Rhizopus and especially the species Rhizopus nigricans. The resulting 11α-hydroxy-16,17-oxidoprogesterone is then separated by extraction or chromatography. Esterification may be accomplished by admixing 11α-hydroxy-16,17- oxidoprogesterone with an acylating agent such as, for example, ketene, a ketene of a selected acid, an acid, acid chloride or acid anhydride, or other known acylating agent, usually in a solvent such as, for example, pyridine or the like, or an inert solvent, including solvents such as benzene, toluene, ether, and the like, and heating or allowing to stand at a temperature between about zero degrees centigrade and the boiling point of the reaction mixture, usually about room temperature (25 to thirty degrees centigrade), for a period between about one-half hour and about 96 hours. The time of reaction as well as the temperature at which the reaction is carried out, the acylating agent, and the ratio of reactants may be varied. The reaction mixture is suitably poured into ice or cold water and the product is recovered in an appropriate solvent which is thereafter washed with successive portions of a mildly basic solution and water to obtain a solution of the product which is essentially neutral.

In some instances, the product may crystallize from the reaction mixture, in which case it may be advantageous to separate the product by filtration or other means, wash with water, and thereafter purify by a conventional procedure, such as, for example, by recrystallization from a suitable solvent or by chromatographic purification, as deemed necessary.

The acylating agents employed in the esterification of 11α-hydroxy-16-17-oxidoprogesterone include: formic acid, the anhydrides or acyl halides of acetic, propionic, α- and β-cyclopentylpropionic, butyric, isobutyric, valeric, isovaleric, hexanoic, heptanoic, octanoic, benzoic, phenylacetic, toluic, mandelic, salicylic, gallic, anisic, chloroacetic, dichloroacetic, trichloroacetic, trimethylacetic, bromoacetic, thioglycollic, vinylacetic, lactic, succinic, maleic, m- or p-toluenesulfonic acid, tartaric acids and other like acids, especially those containing less than nine carbon atoms. The acid anhydrides or acyl halides used may also have substituents which are unreactive under the conditions of reaction, such as chloro, bromo, iodo atoms or methoxy, ethoxy, hydroxy, vinyl or thio groups.

The following examples are illustrative of the process and products of the present invention, but are not to be construed as limiting.

EXAMPLE 1

*11α-hydroxy-16,17-oxidoprogesterone*

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Three liters of this sterilized medium was inoculated with *Rhizopus nigricans* minus strain, American Type Culture Collection Number 6227b, and incubated for 24 hours at a temperature of 28 degrees centigrade using a rate of aeration and stiring such that the oxygen uptake was 6.3 to 7 millimoles per hour per liter of $Na_2SO_3$ according to the method of Cooper, Fernstrom and Miller, Ind. Eng. Chem. 36, 504 (1944). To this medium containing a 24-hour growth of *Rhizopus nigricans* minus strain was added one gram of 16,17-oxidoprogesterone in thirty milliliters of absolute ethanol to provide a suspension of the steroid in the culture. After an additional 24-hour period of incubation under the same conditions of temperature and aeration, the beer and mycelium were extracted. The mycelium was filtered, washed twice, each time with a volume of acetone approximately equal to the volume of the mycelium and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride with about three to five grams of anhydrous sodium sulfate per liter of solvent and filtering, the solvent was removed by distillation. The extractives obtained upon evaporation of the methylene chloride solvent weighed 2.5492 grams.

Partial decolorization of the crude extractives was effected by dissolving them with 35 milliliters of methylene chloride, adding three grams of Magnesol synthetic magnesium silicate and filtering. Upon evaporation of the solvent, the residue was taken up in an excess of acetone, mixed with 0.2 gram of Celite No. 545 diatomaceous earth, filtered, and evaporated to dryness. A total of 3.23 grams of solids were thus obtained which were dissolved in 100 milliliters of benzene and chromatographed over fifty grams of alumina. The following 100-milliliter fractions of eluates were taken:

TABLE I

| Fraction | Solvent | Eluate Solids, Milligrams |
| --- | --- | --- |
| 1 | benzene | 742.2 |
| 2 | do | 157.5 |
| 3 | benzene-ether 19:1 | 99.4 |
| 4 | do | 102.5 |
| 5 | benzene-ether 9:1 | 165.7 |
| 6 | do | 190.5 |
| 7 | benzene-ether 1:1 | 478.1 |
| 8 | do | 356.3 |
| 9 | ether | 157.3 |
| 10 | do | 63.4 |
| 11 | ether-CHCl₃ 19:1 | 42.7 |
| 12 | do | 31.0 |
| 13 | ether-CHCl₃ 9:1 | 27.8 |
| 14 | do | 29.4 |
| 15 | ether-CHCl₃ 1:1 | 35.5 |
| 16 | do | 32.5 |
| 17 | do | 17.9 |
| 18 | do | 11.9 |
| 19 | chloroform | 7.2 |
| 20 | do | 1.9 |
| 21 | do | 0 |
| 22 | do | 2.6 |
| 23 | CHCl₃-acetone 19:1 | 4.4 |
| 24 | acetone | 13.7 |
| 25 | methanol | 47.4 |
| 26 | do | 3.0 |

Fractions 3 to 8, inclusive, were combined and yielded after evaporation 1.393 grams of solids. These solids were recrystallized from four milliliters of methylene chloride by the slow addition of twenty milliliters of ether. After a second recrystallization, 330 milligrams of 11α-hydroxy-16,17-oxidoprogesterone was obtained of melting point 247 to 249 degrees centigrade. Infrared analysis confirmed the postulated structure for 11α-hydroxy-16,17-oxidoprogesterone.

EXAMPLE 2

*11α-hydroxy-16,17-oxidoprogesterone*

A medium was prepared of 0.5 gram of soy flour, two grams of dextrose, and 0.5 gram each of debittered brewer's yeast extract, sodium chloride, and potassium dihydrogen phosphate diluted with tap water to 100 milliliters and adjusted with hydrochloric acid to a pH of 4.5. This serilized medium was inoculated with spores of *Rhizopus reflexus* ATCC 1225 from a malt agar slant, and incubated for 24 hours at a temperature of 28 degrees centigrade using agitation and aeration corresponding to an oxygen uptake of eight millimoles per hour per liter of $Na_2SO_3$ according to Cooper, Fernstrom and Miller, Ind. Eng. Chem. 36, 504 (1944). To this medium, containing a 24-hour growth of *Rhizopus reflexus*, was added twenty milligrams of 16,17-oxidoprogesterone dissolved in one milliliter of acetone to produce a suspension of the steroid in the culture. After an additional 24-hour period of incubation under the same conditions of temperature and aeration, the beer and mycelium were extracted as in Example 1. The concentrated extract was subjected to separation by paper chromatography using a propylene glycol-toluene system to yield 11α-hydroxy-16,17-oxidoprogesterone.

EXAMPLE 2A

*11α-hydroxy-16,17-oxidoprogesterone*

Otherwise as in Example 2, similar results were produced by fermentation of *Rhizopus reflexus* in a medium consisting of two grams of corn steep liquor, two grams of dextrin, 0.10 gram of potassium dihydrogen phosphate, 0.2 gram of sodium nitrate, 0.5 gram of magnesium sulfate heptahydrate, 0.02 gram of potassium chloride, 0.001 gram of ferrous sulfate heptahydrate, and 0.25 gram sodium acetate diluted with tap water to 100 milliliters and adjusted with concentrated sodium hydroxide to a pH of 7.0.

EXAMPLE 3

*11α-acetoxy-16,17-oxidoprogesterone*

To 94 milligrams of 11α-hydroxy-16,17-oxidoprogesterone dissolved in two milliliters of barium oxide-dried pyridine was added one milliliter of redistilled acetic anhydride and the reaction mixture maintained at room temperature for sixteen hours. The reaction mixture was then diluted to eighty milliliters with ice water and thereafter placed in a refrigerator for 24 hours. The thus-produced crystalline precipitate of 11α-acetoxy-16,17-oxidoprogesterone was filtered, washed with four one-milliliter portions of ice water and thereafter dried in vacuum at sixty degrees centigrade. The dry product was repeatedly recrystallized from ethyl acetate to yield 19.7 milligrams of 11α-acetoxy-16,17-oxidoprogesterone of melting point 225 to 226 degrees centigrade.

*Analysis.*—Percent calculated for $C_{23}H_{30}O_5$: C, 71.48; H, 7.82. Found: C, 71.41; H, 7.72.

EXAMPLE 4

*11α-formyloxy-16,17-oxidoprogesterone*

11α-formyloxy-16,17-oxidoprogesterone is prepared by reacting 11α-hydroxy-16,17-oxidoprogesterone with an excess of formic acid during a period of twelve hours at room temperature.

EXAMPLE 5

*11α-propionoxy-16,17-oxidoprogesterone*

In the same manner as in Example 3, 11α-propionoxy-16,17-oxidoprogesterone is prepared by reacting 11α-hydroxy-16,17-oxidoprogesterone with propionic anhydride in pyridine.

EXAMPLE 6

*11α-butyroxy-16,17-oxidoprogesterone*

In the same manner as in Example 3, 11α-butyroxy-16,17-oxidoprogesterone is prepared by reacting 11α-hydroxy-16,17-oxidoprogesterone with butyric anhydride in pyridine.

EXAMPLE 7

*11α-(β-cyclopentyl)-propionoxy-16,17-oxidoprogesterone*

In the same manner as in Example 3, 11α-(β-cyclopentyl)-propionoxy-16,17-oxidoprogesterone is prepared by reacting 11α-hydroxy-16,17-oxidoprogesterone with β-cyclopropionyl chloride in pyridine.

EXAMPLE 8

11α-benzoyloxy-16,17-oxidoprogesterone

In the same manner as in Example 3, 11α-benzoyloxy-16,17-oxidoprogesterone is prepared by reacting 11α-hydroxy-16,17-oxidoprogesterone with benzoyl chloride in pyridine.

In the manner of Examples 3 through 8, by treating 11α-hydroxy-16,17-oxidoprogesterone with organic acids, anhydrides, ketenes of organic acids, or acyl halides, the corresponding 11α-esters are obtained, such as, for example: 11α-valeroxy-16,17-oxidoprogesterone, 11α-isovaleroxy-16,17 - oxidoprogesterone, 11α - hexanoyloxy - 16,17-oxidoprogesterone, 11α - heptanoyloxy - 16,17 - oxido-progesterone, 11α - octanoyloxy - 16,17 - oxidoprogesterone, 11α-trimethylacetoxy-16,17-oxidoprogesterone, 11α-glycollyloxy-16,17-oxidoprogesterone, 11α - vinylacetoxy-16,17-oxidoprogesterone, 11α-chloroacetoxy-16,17-oxidoprogesterone, 11α-dichloroacetoxy-16,17 - oxidoprogesterone, 11α-trichloroacetoxy-16,17-oxidoprogesterone, 11α-bromoacetoxy-16,17-oxidoprogesterone, 11α-thioglycollyl-oxy-16,17 - oxidoprogesterone, 11α - succinyloxy - 16,17-oxidoprogesterone, 11α-malyloxy-16,17 - oxidoprogesterone, 11α-tartaryloxy-16,17-oxidoprogesterone, 11α-gallyl-oxy-16,17-oxidoprogesterone, 11α-anisyloxy-16,17-oxido-progesterone, 11α-salicylyloxy-16,17 - oxidoprogesterone, 11α-toluyloxy-16,17-oxidoprogesterone, 11α-phenylacetyl-oxy - 16,17 - oxidoprogesterone, 11α - benzoyloxy - 16,17-oxidoprogesterone, 11α - mandelyloxy - 16,17 - oxidoprogesterone, 11α-lactyloxy-16,17-oxidoprogesterone, 11α-(m- or p-toluenesulfonoxy) - 16,17 - oxidoprogesterones, and the like.

It is to be understood that the invention is not to be limited to the exact details or exact compounds shown and described as obvious modifications and equivalents will be apparent to one skilled in the art, and the invention is therefore to be limited only by the scope of the appended claims.

We claim:

1. An 11-oxygenated-16,17-oxidoprogesterone represented by the structural formula:

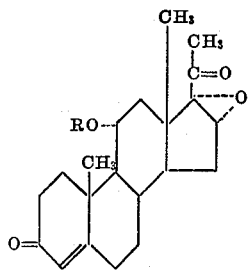

wherein R is selected from the group consisting of hydrogen, toluenesulfonyl, and hydrocarbon carboxylic acid acyl radicals containing less than nine carbon atoms.

2. 11α-hydroxy-16,17-oxidoprogesterone.
3. An 11α-acyloxy-16,17-oxidoprogesterone, wherein the acyloxy group is of the formula AcO, Ac being the acyl radical of a hydrocarbon carboxylic acid containing less than nine carbon atoms.
4. 11α-acetoxy-16,17-oxidoprogesterone.
5. 11α-propionoxy-16,17-oxidoprogesterone.
6. 11α-benzoyloxy-16,17-oxidoprogesterone.

References Cited in the file of this patent

UNITED STATES PATENTS

| | | |
|---|---|---|
| 2,662,904 | Julian | Dec. 15, 1953 |
| 2,686,181 | Julian | Aug. 10, 1954 |